US011958615B2

(12) United States Patent
Burd

(10) Patent No.: US 11,958,615 B2
(45) Date of Patent: Apr. 16, 2024

(54) THERMOSTATICALLY CONTROLLED GALLEY AIR EXTRACTION

(71) Applicant: B/E Aerospace, Inc., Winston-Salem, NC (US)

(72) Inventor: Peter J. L. Burd, Burry Port (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 186 days.

(21) Appl. No.: 17/211,080

(22) Filed: Mar. 24, 2021

(65) Prior Publication Data

US 2021/0300569 A1 Sep. 30, 2021

Related U.S. Application Data

(60) Provisional application No. 63/000,664, filed on Mar. 27, 2020.

(51) Int. Cl.
B64D 13/00 (2006.01)
B64D 11/04 (2006.01)
F16K 15/00 (2006.01)

(52) U.S. Cl.
CPC ............. B64D 13/00 (2013.01); B64D 11/04 (2013.01); F16K 15/00 (2013.01)

(58) Field of Classification Search
CPC ................... B64D 13/00; B64D 11/04; B64D 2013/0655; F16K 15/00; F24C 15/2042; F24C 15/20

(Continued)

(56) References Cited

U.S. PATENT DOCUMENTS 2,970,768 A 2/1961 Curran
3,213,928 A 10/1965 Anderson et al.
(Continued)

FOREIGN PATENT DOCUMENTS

CA 1076908 A 5/1980
CN 200982144 11/2007
(Continued)

OTHER PUBLICATIONS

Extended Search Report for European Application No. 21165691.3 dated Aug. 23, 2021, 10 pages.

Primary Examiner — Steven B McAllister
Assistant Examiner — Charles R Brawner
(74) Attorney, Agent, or Firm — Suiter Swantz pc llo

(57) ABSTRACT

A system for controlling airflow from a galley compartment to a plenum chamber is disclosed. The system includes an actuating assembly. The actuating assembly includes a cylinder, a heat-expanding material disposed in the cylinder, and a piston disposed in the cylinder, wherein the heat-expanding material is configured to actuate the piston when the heat-expanding material is heated. The system includes a valve assembly. The valve assembly may include a louver assembly coupled to the actuating assembly. The louver assembly includes a louver frame, one or more louver blades and bracket and a connecting rod that couples the actuating assembly to the valve assembly. The valve assembly may also include a poppet valve. The poppet valve includes a poppet body element, a poppet stem coupled to the actuating assembly that is inserted into a channel within the poppet body element, and a poppet head coupled to the poppet stem.

20 Claims, 6 Drawing Sheets

(58) Field of Classification Search
USPC .......................................................... 454/73
See application file for complete search history.

(56) References Cited

U.S. PATENT DOCUMENTS

| | | | |
|---|---|---|---|
| 3,654,768 A | 4/1972 | Inglis et al. | |
| 3,659,783 A | 5/1972 | Schwartz | |
| 4,154,215 A | 5/1979 | Tjernstrom | |
| 2010/0224726 A1 | 9/2010 | Lu et al. | |
| 2015/0251761 A1 | 9/2015 | Vandyke et al. | |
| 2020/0147425 A1* | 5/2020 | Wright | A62C 2/247 |
| 2021/0140699 A1* | 5/2021 | Moran | B64D 11/04 |

FOREIGN PATENT DOCUMENTS

| | | | |
|---|---|---|---|
| CN | 203067074 U | 7/2013 | |
| CN | 103850774 A | 6/2014 | |
| CN | 104653271 A | 5/2015 | |
| GB | 1583522 A | 1/1981 | |
| JP | 1994010671 A | 1/1994 | |
| JP | 1995234009 A | 9/1995 | |
| WO | 2013142535 A3 | 11/2013 | |

* cited by examiner

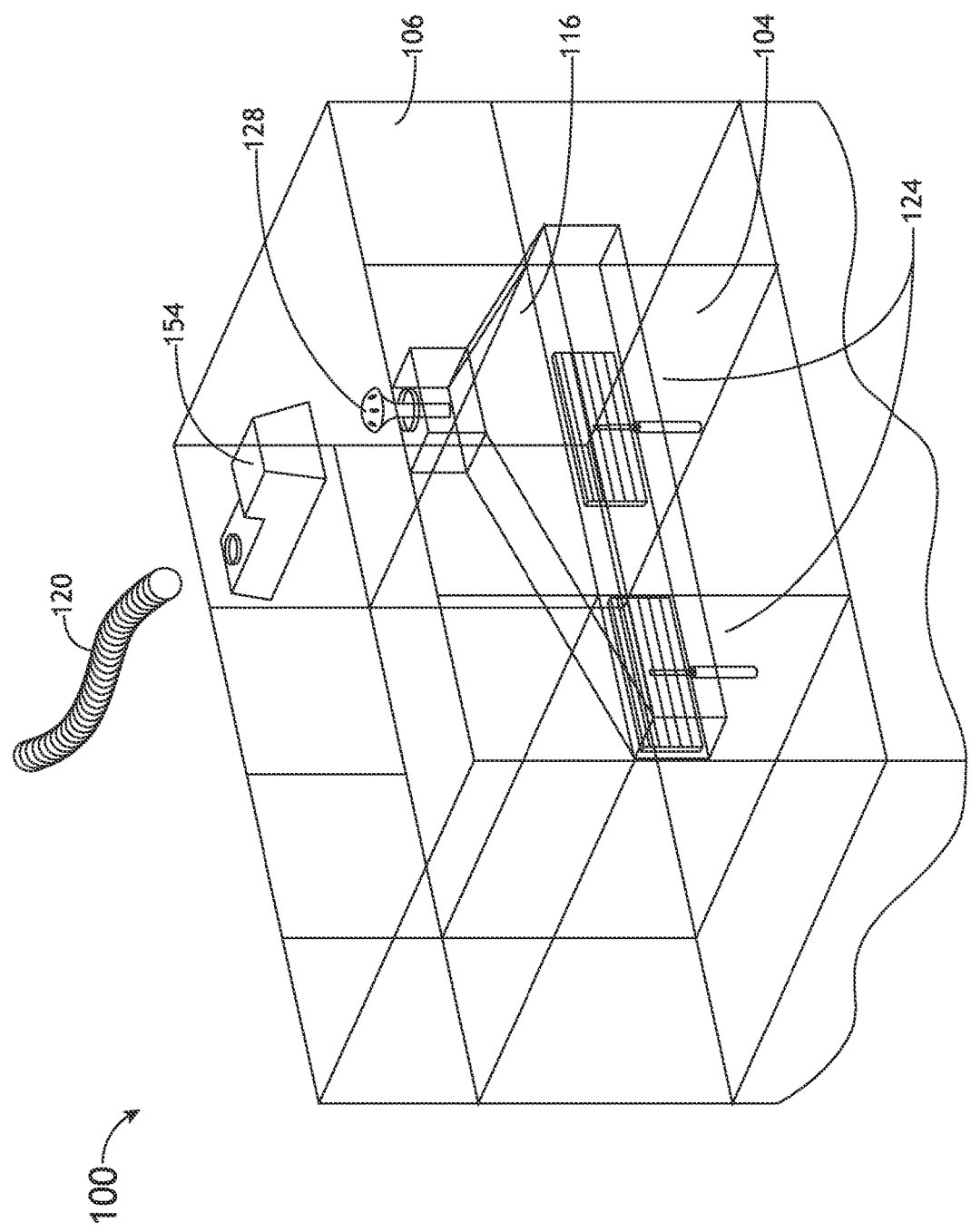

THERMOSTATICALLY CONTROLLED GALLEY AIR EXTRACTION

PRIORITY

The present application claims the benefit under 35 U.S.C. § 119(e) of U.S. Provisional App. No. 63/000,664 (filed Mar. 27, 2020), which is incorporated herein by reference.

BACKGROUND

In commercial aircraft with galley monuments installed, it is common to have beverage makers, ovens, refrigerators, and other galley insert equipment installed for the purpose of providing a catering service for passengers. All of these appliances produce waste heat and odors when in use. It is common to extract the air from around these appliances using an aircraft-based galley extraction system for cooling and environmental purposes. However, if the capacity of the galley extraction systems is overloaded by a large number of appliances installed within the aircraft, or if the extraction system operates regardless of whether the appliances are in operation or not, then it may not be possible to extract the minimum standard volumes of air at each individual appliance, possibly resulting in overheating of the appliances, increased working temperatures for aircraft staff and passengers, surface touch temperatures exceeding the mandatory maximum requirements, and the escape of cooking odors. Therefore, it would be advantageous to provide a solution that cures the shortcomings described above.

SUMMARY

A system for controlling airflow from a galley compartment to a plenum chamber is disclosed. In some embodiments, the system includes an actuating assembly. In some embodiments, the actuating assembly includes a cylinder. In some embodiments, the actuating assembly includes a heat-expanding material that is disposed within the cylinder. In some embodiments, the actuating assembly includes a piston disposed within the cylinder. In some embodiments, the heat-expanding material is configured to actuate the piston when the heat-expanding material is heated. In some embodiments, the actuating assembly includes a piston seal. In some embodiments, the system includes a valve assembly coupled to the actuating assembly and disposed upon at least one of a surface of the galley compartment or a face of the plenum chamber. In some embodiments, an adjustment of the valve by the actuating assembly adjust airflow within an opening of the at least one of the surface of the galley compartment or the face of the plenum chamber. In some embodiments, the actuating assembly further includes a return spring seated at one end at the piston and its opposite end at a retaining surface proximate to an open face of the cylinder. In some embodiments, a compressive force of the return spring upon the piston at least partially counteracts the force of the heat-expanding material on the piston.

In some embodiments of the system, the valve assembly further includes a connecting rod. In some embodiments, a first end of the connecting rod is coupled to the piston. In some embodiments, the valve assembly further includes a louver assembly coupled to a second end of the connecting rod. In some embodiments, the louver assembly includes a louver frame. In some embodiments, the louver assembly includes one or more louver blades disposed within the louver frame. In some embodiments, the louver assembly includes a bracket coupled to the louver frame and the connecting rod. In some embodiments, an articulation of the connecting rod causes a movement of one or more louver blades. In some embodiments, the movement of one or more louver blades adjusts an airflow within an opening of at least one of the surface of the galley compartment or the face of the plenum chamber.

In some embodiments of the system, the heat-expanding material is configured of at least one of a wax, a gel, or a copolymer.

In some embodiments of the system, the one or more louver blades are configured to pivot relative to the louver frame upon the articulation of the connecting rod.

In some embodiments of the system, the one or more louver blades are configured to reciprocate along the surface of at least one of the galley compartment or the face of the plenum chamber upon the articulation of the connecting rod, wherein the reciprocation adjusts airflow within the opening of at least one of the surface of the galley compartment or the face of the plenum chamber.

In some embodiments of the system, the one or more louver blades are configured to rotate along a rotation axis, wherein the rotation adjusts airflow within the opening of at least one of the surface of the galley compartment or the face of the plenum chamber.

In some embodiments of the system, the system further includes an air bleed pathway configured to allow air from the galley compartment to contact the heat-expanding material.

In some embodiments of the system, the valve assembly is disposed within a plenum chamber.

In some embodiments of the system, the valve assembly further includes a poppet valve. In some embodiments, the poppet valve comprises a poppet body seat coupled to an open face of the cylinder. In some embodiments, the poppet body seat is coupled to at least one of the surface of the galley compartment or the face of the plenum chamber. In some embodiments, the poppet valve further includes a poppet stem coupled to the piston. In some embodiments, the poppet stem is inserted into a channel formed in the poppet body seat. In some embodiments, the poppet valve includes a poppet head coupled to the poppet stem. In some embodiments, the movement of the poppet head adjusts an airflow within an opening of at least one of the surface of the galley compartment or the face of the plenum chamber.

In some embodiments of the system, the heat-expanding material is at least one of a wax, a gel, or a copolymer.

In some embodiments of the system, the system further comprises an air bleed pathway configured allow air from the galley compartment to contact the heat-expanding material.

In some embodiments of the system, the air bleed pathway is further configured to move air through one or more air bleed holes within the poppet head.

In some embodiments of the system, the system further includes a bellow chamber configured to improve airflow through the valve assembly.

In some embodiments of the system, the valve assembly is coupled to at least one end of a hose or a manifold.

In some embodiments of the system, the system includes at least one actuating assembly coupled to a valve assembly containing a louver assembly and at least one actuating assembly coupled to a valve assembly containing a poppet valve.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1B is a diagram illustrating a rear-view of an example environment of a system for controlling airflow from a galley compartment to a plenum chamber, in accordance with one or more embodiments of this disclosure.

DETAILED DESCRIPTION

Figure 1A:
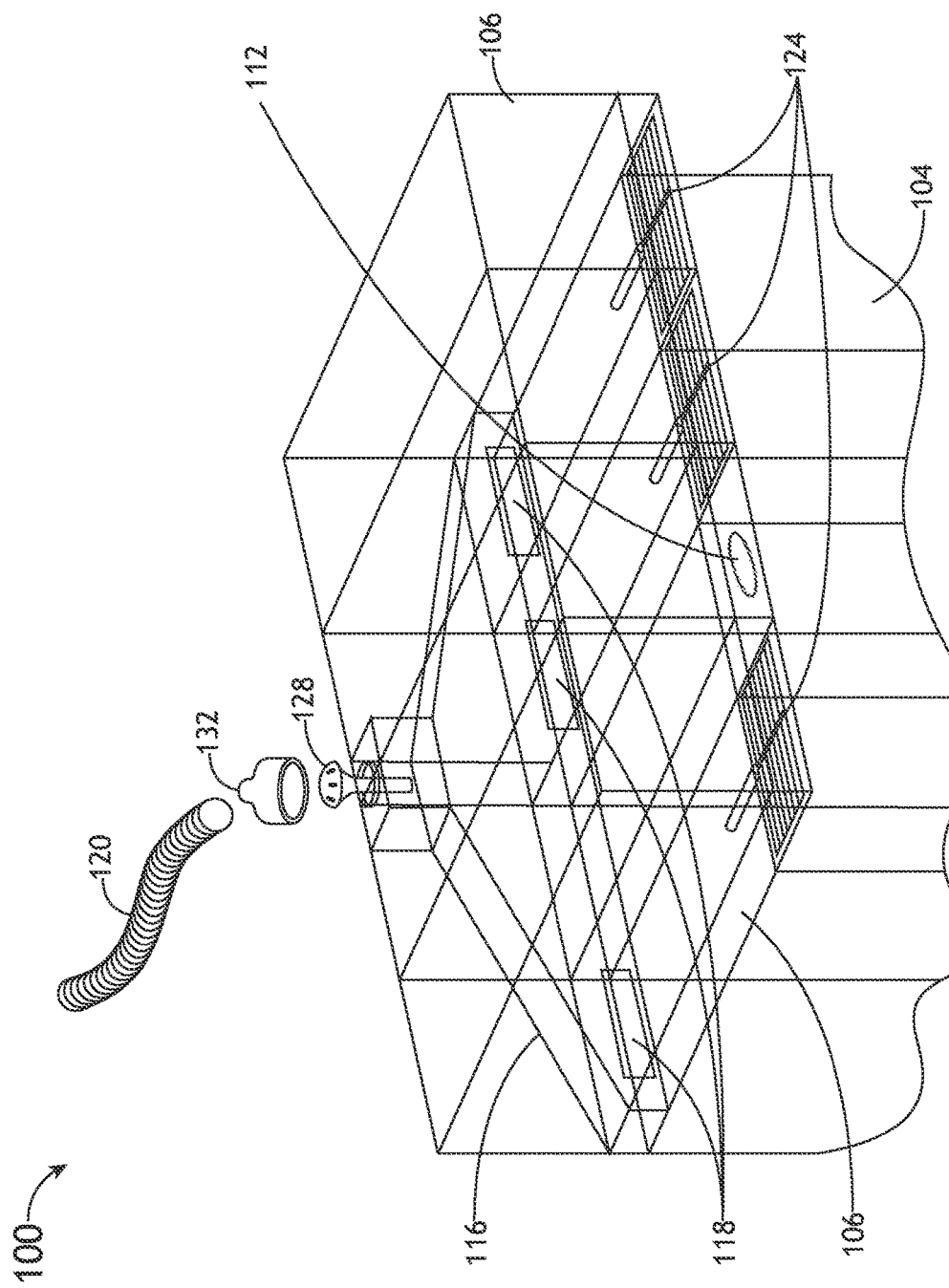
FIG. 1A is a diagram illustrating an example environment of a system for controlling airflow from a galley compartment to a plenum chamber, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the embodiments of the inventive concepts disclosed herein are directed to devices within a galley, such as an aircraft or train galley, where food is prepared that regulate the movement of air between the galley and an air extraction system (e.g., an aircraft galley ventilation system). Many commercial passenger transport vehicles have galleys and/or galley monuments that have multiple food preparation appliances installed. Many of these food preparation appliances produce large amounts of heat, including appliances such as ovens, refrigerators, and beverage makers. The heat generated from these appliances may be detrimental to the electronic componentry and other aspects of the operation of the appliance. The heat also increases the overall temperature of the air in the galley, possibly causing discomfort to staff and/or passengers, and may also exceed mandated maximum surface touch temperatures on the appliance surface. The appliances within the galley also may generate odors that are unpleasant to staff and/or passengers. To counter the heat and odor issues, galley air extraction systems have been created to remove the offending air from the galley. Many of these extraction systems involve ductwork that hold air at a lower pressure than air within the galley. Vents built into the interface between the galley and air extraction system allow hot and/or odiferous air to be removed into the ductwork, where it may be either expelled or retained within another area in the vehicle.

The use of vents within the air extraction systems can be problematic. Newer generations of appliances, particularly food and/or beverage heating devices, tend to generate more heat than previous devices which cannot be adequately be removed by the original vents. This increase in heat may also require an increase in airflow by the air extraction system, which may not be possible due to limits in the design of the air extraction system. If an increased air flow is achieved, the increased air flow during times when the galley is not in use is a wasted energy. The embodiments of the inventive concepts disclosed herein are intended as air flow devices that automatically controls flow of air from the galley into the air extraction system on a need basis. The devices are dependent on a temperature sensitive material that expands when heat is applied. The devices operate on an "on demand" basis, do not require any electrical or electronic equipment, and may be retrofitted on any commercial aircraft with an air handling system.

FIG. 1A and FIG. 1B illustrate an example environment 100 for a system for controlling airflow from a galley compartment to an adjoining plenum chamber, in accordance with one or more embodiments of this disclosure. The example environment 100 includes one or more galley compartments 104. The galley compartment 104 houses heat-producing appliances of the galley, including but not limited to ovens, refrigerators, and beverage makers. The galley compartment 104 may also include areas used by galley staff to perform food preparation tasks. The example environment may also include one or more standard unit compartments 106 used for galley storage and/or meal storage. Air from the galley compartment 106 may or may not freely flow back and forth from the galley compartment 104

In some embodiments, the example environment 100 further includes a plenum chamber 108 disposed adjacent to the galley compartment 104. The plenum chamber 108 is pressurized at a lower pressure than the galley compartment. The plenum chamber 108 may be of any size or shape. For example, the plenum chamber 108 may be a wide and relatively flat structure that is disposed upon the galley compartment 104 (e.g., as in FIG. 1A). In some embodiments, the example environment includes one or more openings 112 that connects the galley compartment 104 to the plenum chamber 108, allowing airflow between the two compartments. Since the air pressure in the galley compartment 104 is higher than the air pressure in the plenum chamber 108, air will flow through the opening 112 from the galley compartment 104 into the plenum chamber 108 unless the opening is obstructed.

In some embodiments, the galley compartment 104 and the plenum chamber 108 are adjoining. For example, at least one surface of the galley compartment 104 may be immediately flush, or is a part of, a least one surface of the plenum chamber 108. In this manner, the opening 112 would comprise a hole that matches between the two surfaces, allowing air to pass between the galley compartment 104 and the plenum chamber 108. In some embodiments, the adjoining surfaces of the galley compartment 104 and the plenum chamber 108 is a simple flat surface. However, the adjoining surface may be a complex surface. For example, an extension (e.g., a pipe) from either the galley compartment 104 or the plenum chamber 108 may be used to adjoin to the other respective compartment. Therefore, the above description should not be interpreted as a limitation of the present disclosure, but merely as an illustration.

In some embodiments, the plenum chamber 108 may be coupled to a manifold 116. The manifold 116 is a structure that directs air from the plenum chamber 108 into other componentry of the air extraction system of the aircraft (e.g., to a discharge port). The manifold may be of any size or shape. For example, the manifold 116 may be a triangular structure set toward the rear of the plenum chamber 108. In some embodiments, air may enter the manifold from the plenum chamber 108 via a vent 118 within the manifold 116. In some embodiments, the manifold 116 may be coupled to an extraction hose 120. The extraction hose assists in directing air from the extraction compartment to the other componentry of the air extraction system. In some embodiments, the extraction hose 120 is coupled directly to the manifold 116 via a port 122. In some embodiments, a bellow chamber 123 is used to couple the extraction hose 120 to the port 122 of the manifold 116 In another embodiment, the extraction hose is omitted (e.g., the plenum chamber is directly coupled to other componentry of the air extraction system).

In some embodiments, the system includes a valve assembly configured to control airflow through the opening 112 or the port. In some embodiments, the valve assembly is a louver-type valve assembly 124 (e.g., shown in FIG. 1A as covering openings 112. In some embodiments, the valve assembly is a poppet-style valve assembly 128 (e.g., a 'mushroom' valve).

FIG. 1B is a diagram illustrating a rear-view of a second example environment 150 of a system for controlling airflow from a galley compartment 104 to a plenum chamber 108, in accordance with one or more embodiments of this disclosure. The second example environment 150 is configured with one or more, or all components of the example environment 100, and vice-versa. In this second example embodiment 150, the manifold 116 directly receives air from the galley compartment 104 via the louver-type valve assembly 124 (i.e., the manifold is acting as a de facto plenum chamber 108 as in FIG. 1B. Air then travels through the port 122 via the poppet-style valve assembly 128. As in FIG. 1A, an extraction hose 120 may connect directly to the port 122 or may use a bellow chamber 123 to couple to the port 122. In some embodiments, an adapter duct 154 may be used to couple the extraction hose 120 to the port 122. It should be known that air extraction systems that have separate plenum chamber 108 and manifold 116 sections may have vents 118 that are controlled by a louver-style valve assembly 124. Therefore, the above description should not be interpreted as a limitation of the present disclosure, but merely as an illustration.

The louver-type valve assembly 124 and the poppet-style valve assembly 128 may also be installed in many different configurations. For example, the louver-type valve assembly 124 and/or the poppet-style valve assembly 128 may be installed on a wall (e.g., a vertically oriented wall), on a ceiling, or on a floor). In another example, the louver-type valve assembly 124 and/or the poppet-style valve assembly 128 may be installed on either an interior surface or an exterior surface of the galley compartment 104 or the plenum chamber 108. Therefore, the above description should not be interpreted as a limitation of the present disclosure, but merely as an illustration.

In some embodiments, the louver-type valve assembly 124 and the poppet-style valve assembly 128 are used together in within an air extraction system (e.g., such as in the example environments 100, 150). For example, the poppet-style valve assembly 128 may be used to control the total gallery airflow, while the louver-type valve assembly 124 may be used to control the extraction of or air near each individual appliance. In some embodiments, either the louver-style valve assembly 124 or the poppet-style valve assembly 128 may be used (i.e., the assemblies may work independently of each other). Therefore, the above description should not be interpreted as a limitation of the present disclosure, but merely as an illustration.

Figure 2:
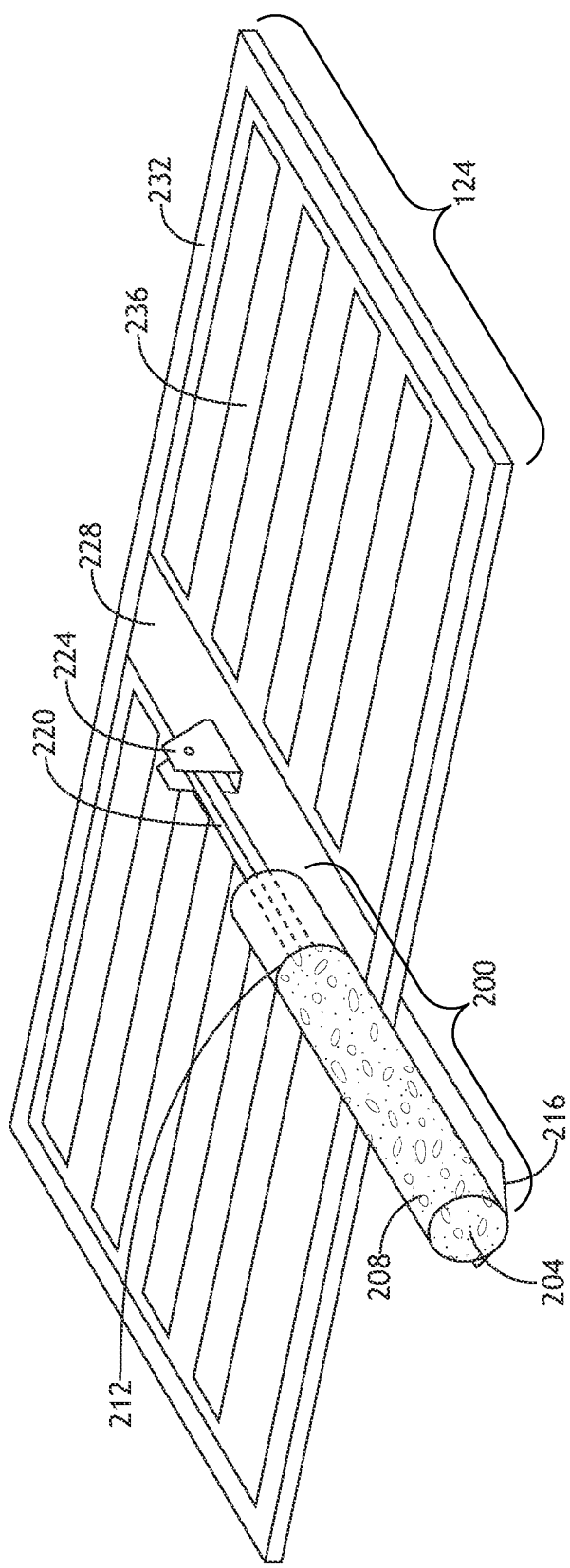
FIG. 2 is a diagram illustrating an actuating assembly coupled to a louver-type valve assembly, in accordance with one or more embodiments of this disclosure.

FIG. 2 illustrates an actuating assembly coupled to a louver-type valve assembly 124, in accordance with one or more embodiments of this disclosure. In some embodiments, the louver-type valve assembly 124 includes an actuating assembly 200. The actuating assembly 200 is configured to provide a motive force upon an increase in temperature (i.e. the actuating assembly 200 is a mechanical actuator used to provide unidirectional force through a unidirectional stroke, acting similarly to a hydraulic cylinder). In some embodiments, the actuating assembly 124 includes a cylinder 204.

The cylinder 204 is a hollow tube with one open end that houses componentry of the actuating assembly 200. The cylinder 204 may also provide a resistance for the components of the actuating assembly to act upon, resulting in a motive force. The cylinder 204 may be of any shape and size known in the art that can provide a unidirectional force. For example, the cylinder 204 may have the external shape of a traditional cylinder shape. In another example, the cylinder 204 may have one or more flat surfaces along its external length. Therefore, the above description should not be interpreted as a limitation of the present disclosure, but merely an illustration.

In some embodiments, the actuating assembly 200 further includes a heat-expanding material 208 disposed within the cylinder 204. The heat-expanding material 208 changes volume over a range of temperatures (typically, the volume expands when heat is applied). Expansion of the heat-expanding material 208 pushes against all interior surfaces of the cylinder 204, delivering a motive force that can articulate movement.

The heat-expanding material 208 may be any material known in the art, including but not limited to a wax or a gel. For example, the heat-expanding material gel may be a copolymer gel. For instance, the copolymer gel may be dimethylaminoethyl methacrylate. In another example, the heat-expanding material 208 may be a paraffin-based wax. It should be noted that the heat-expanding material 208 should be certified as safe to use by the relevant authorities. For example, the heat-expanding material may be compliant to Registration, Evaluation, Authorization, and Restriction of Chemicals (REACH) regulations of the European Union. The heat-expanding material 208 may respond to any range of temperatures. For example, the heat-expanding material 208 may be response to a temperature between 15° C. and 40° C.

In some embodiments, the actuating assembly 210 includes a piston 212. The piston 212 is a disk closely fitting within the cylinder 204 in which the piston moves up or down within the cylinder 204, depending on the expansion of the heat-expanding material 208 (e.g., the piston traps the heat-expanding material within the cylinder 204.) In some embodiments, the further includes a piston seal. For example, the piston seal is an O-shaped structure disposed upon the circumference of the piston, further providing a seal between the circumference of the piston 212 and the inner side wall of the cylinder 204.

In some embodiments, the actuating assembly includes a return spring 214 disposed between the piston and a side wall of the cylinder 204 (not shown in FIG. 2). The return spring 214 provides a countering force to the heat-expanding material 208, pushing the piston to a default position when the heat-expanding material 208 has cooled. The return spring can be any spring known in the art, including but not limited to a compression spring. In some embodiments, the return spring 214 is seated with one end at the piston 212 and the opposite end at a retaining surface proximate to an open face of the cylinder 204. For instance, the open end of the cylinder 204 may be partially occluded within its circumference, allowing space for the connecting rod 220 to be inserted, while allowing a surface for the return spring 214 to push against. In some embodiments, the connecting rod 220 is inserted through the return spring 214. In some embodiments, one or more return springs 214 are utilized with each return spring 214 seated with one end at the piston 212 and the other end at the cylinder surface. Many configurations for the return spring 214 within the louver-style assembly are possible. Therefore, above description should not be interpreted as a limitation of the present disclosure, but merely as an illustration.

In some embodiments the actuating assembly 200 and/or the louver-style valve is configured to bleed air through the surface of the galley compartment 104 and/or the face of the plenum chamber 108 (e.g., most aircraft systems are intended to extract air constantly, and therefore air may be bled through the valve constantly). By bleeding a small amount of air (e.g., through an air bleed pathway), the space within and immediately surrounding the actuating assembly will mix rapidly with the surrounding air (e.g., such as air near heat producing appliances), further exposing the heat-expanding material 208 to the air and decreasing the response time of the actuating assembly 200. For example, the air may bleed directly from one or more small holes (e.g., holes considerably smaller than the openings 112) formed in at least one of the surface of the galley compartment or the face of the plenum chamber. Air flowing through these holes may come into contact with the cylinder 204 (e.g., the underside of the cylinder 204 in FIG. 2), or other components of the actuating assembly 200.

In some embodiments, the actuating assembly includes a deflector 216. The deflector 216 increases the circulation of air to the heat-expanding material 208 within the cylinder 204. For example, the one or more small holes formed in the surface of the galley compartment or the face of the plenum chamber that allows air to come into contact with the cylinder 204 may be further deflected by the deflector 216 further distributing the air throughout the length of the cylinder 204, allowing the air to heat and/or cool the heat-expanding material 208 within the cylinder 204.

In some embodiments, the louver-style valve assembly 124 includes a connecting rod 220 and a bracket 224. The connecting rod is coupled to the piston 212 on one end, and the bracket 224 on the other end. For example, expansion of the heat-expanding material 208 through the addition of heat pushes the piston 212 towards the opening within the cylinder 204. The connecting rod 220 is articulated along with the piston, which then articulates the bracket 224. The movement of the connecting rod may be any range of movement needed to adjust the constriction of the opening. For example, the movement may be up to one centimeter. In another example, the movement may be up to 5 centimeters.

In some embodiments, the louver-style valve assembly 124 includes a louver assembly 228. The louver assembly 228 includes a louver frame 232 and one or more louver blades 236. The louver frame 232 provides a housing for the louver blades 236 and provides the mechanism for the coordinated movement of the louver blades 236. The louver frame also provides an attachment point for the bracket 224. The louver blades 236 are disposed at or near the one or more openings 112. Adjustment of the louver blades (e.g., through movement of the bracket articulated through the action of the articulation assembly) adjust the airflow through the opening.

The mechanism of articulation of the louver blades 236 may be any mechanism known in the art. For example, the louver blades 236 may be configured to rotate relative to the louver frame 232 along a rotational axis (e.g., along the long axis, as in a venetian blind) when the bracket 224 is articulated. In this manner, the rotation of the louver blades 236 may seal the opening 112 shut when the louver blades 236 are arranged in a single plane (e.g., the flat side of each louver blade 236 contacting or nearly contacting the flat end of another louver blade 236). The louver blades 236 may reopen through another rotation of the blades (e.g., a rotation that allows the flat side of the louver blades 236 to assume a position perpendicular to the face of the plenum chamber 108 and/or surface of the galley compartment 104). Similarly, in some embodiments, the louver blades 236 are configured to pivot relative to the louver frame 232 upon the articulation of the connecting rod 220, In another example, the louver blades 236 may be configured to reciprocate along the surface of at least one of the surface of the galley compartment 104 or the face of the plenum chamber 108 (e.g., slide along the surface). For instance, the louver blades 236 may be configured to form a slotted plate configured to cover openings 112 (e.g., openings in the form of slots or holes). Upon a sliding movement of the slotted plate, the constriction of the openings 112 are adjusted along with airflow through the openings 112. In some embodiments, the louver-style valve assembly may also include a fixed grill body (e.g., containing slots and or holes) that is disposed over one or more openings 112, where the slots and or holes may be blocked or unblocked by the movement of the slotted plate.

Figure 3:
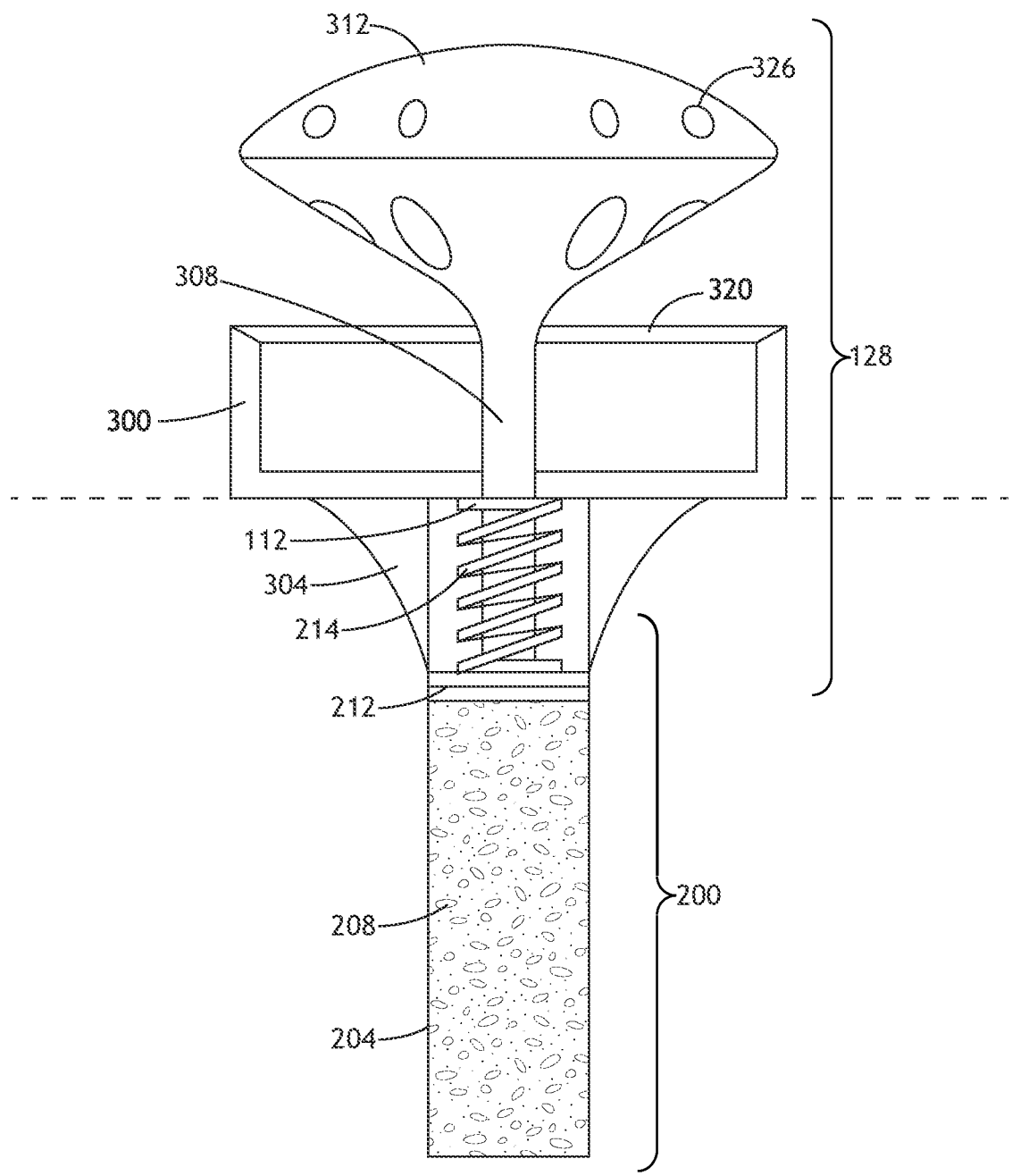
FIG. 3 is a diagram illustrates a side view of an actuating assembly 200 coupled to a poppet-type valve assembly 128, in accordance with one or more embodiments of this disclosure.

FIG. 3 illustrates an actuating assembly 200 coupled to a poppet-type valve assembly 128, in accordance with one or more embodiments of this disclosure. In some embodiments, the actuating assembly 200 of the poppet-style valve assembly 128 includes a cylinder 204. In some embodiments, the actuating assembly 200 further includes a heat-expanding material 208. In some embodiments, the actuating assembly further includes a piston 212. In some embodiments, the actuating assembly includes a piston seal. The cylinder 204, heat-expanding material 208, piston 212 and piston seal of the actuating assembly 200 coupled to the poppet-type valve assembly 128 are similarly structured and have similar actions as that of the actuating assembly 200 of the louver-style valve assembly 124.

It should be known that the actuating assembly 200 coupled to the louver-style valve assembly 124 and the poppet-style valve assembly 128 have similar function and componentry (e.g., the heat-expanding material 208 and the cylinder 204). Therefore, the reference labels for the actuating assemblies 200 and the components of the actuating assemblies 200 coupled to the louver-style valve assembly 124 and the poppet-style valve assembly 128 have been replicated in the interest of clarity In some embodiments, the poppet-type valve assembly 128 includes a poppet body element 300. The poppet body element 300 provides a structure to anchor the poppet-type valve assembly 128 to the surface of the galley compartment 104 and/or the face of the plenum chamber 108 (e.g., as indicated by the dotted line). It should be known that the poppet body element 300 may be disposed above, below, or incorporated into the surface of the galley compartment and/or the face of the plenum chamber 108, the manifold 116, or other ducts. Therefore, the above description should not be interpreted as a limitation of the present disclosure, but merely as an illustration.

In some embodiments, the poppet body element 300 is coupled to the open end of the cylinder 204. For example, the poppet body element 300 may be coupled to the cylinder 204 (e.g., with bolts or screws) with the surface of the galley compartment 104 or face of the plenum chamber 108 sandwiched between the poppet body element 300 and the cylinder 204 (e.g., the poppet body element 300 is disposed upon or within the opening 112 or port 122 to either the surface of the galley compartment 104 or the face of the plenum chamber 108). In some embodiments, the poppet body element 300 and the cylinder 204 are directly coupled. In some embodiments, the poppet-type valve assembly 128 includes a gusset 304. The gusset stabilized the coupling between the poppet body element 300 and the cylinder 204.

Figure 4:
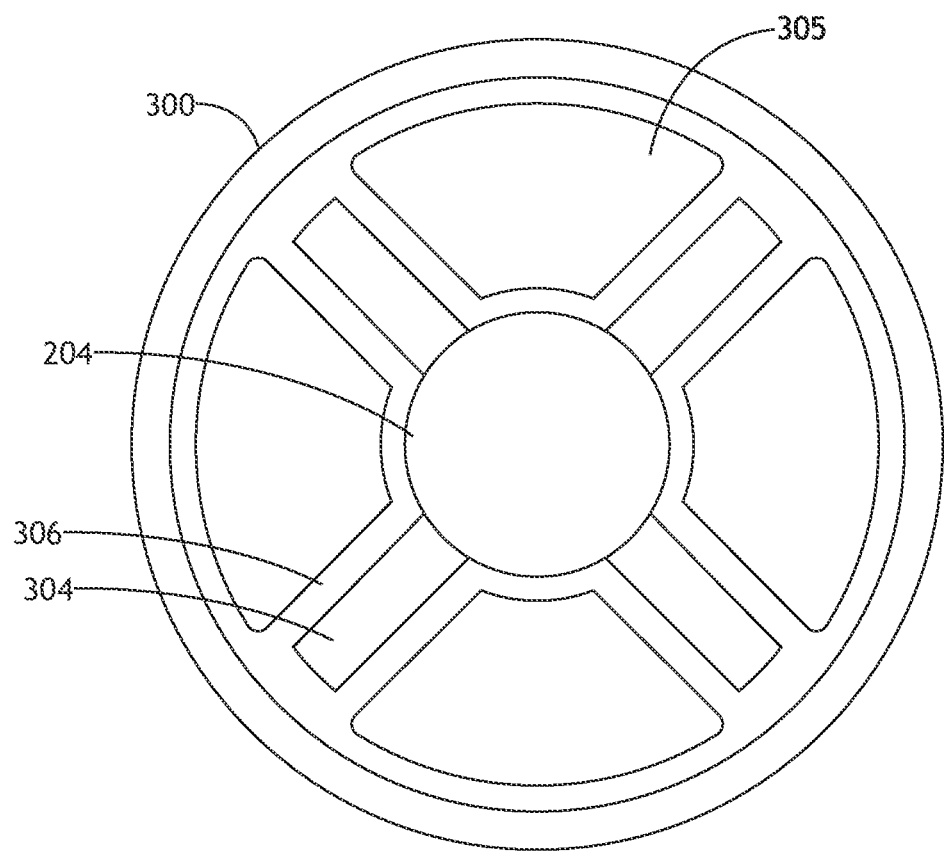
FIG. 4 is a diagram illustrating an underside view of the actuating assembly coupled to the poppet-style valve assembly, in accordance with one or more embodiments of this disclosure.

FIG. 4 is a diagram illustrating an underside view of the actuating assembly 200 coupled to the poppet-style valve assembly 128, in accordance with one or more embodiments of this disclosure. This underside plan view illustrates an underside surface of the poppet body element 300 that interacts with the face of the cylinder. The underside surface of the poppet body element 300 contains several apertures 305 that allow air to flow from the galley compartment 104 into the poppet body element 300. The underside surface of the poppet further contains crossmembers 306 that support the poppet body element 300 and are configured to form a shaft for a poppet stem 308 to slide through (e.g., the poppet stem 308 as shown in FIG. 3). In some embodiments the crossmembers 306 are further supported by one more gussets 304. In some embodiments, the gussets 304 and the crossmembers 306 are configured as a single entity (e.g., the gusset 304 extends into the poppet body element 300, forming the crossmembers 306).

Referring back to FIG. 3, in some embodiments, the actuating assembly 200 of the poppet-type valve assembly 128 further includes a return spring 214. The spring provides a force upon the piston that is opposite of the motive force of the heat-expanding material 208 (i.e., when the heat-expanding material 208 shrinks due to a loss of heat, the return spring 214 assists in pushing the piston towards the shrinking heat-expanding material 208. In some embodiments, the spring is seated with one end at the piston and the opposite end at the poppet body element 300. In some embodiments, the spring 214 is seated with one end at the piston 212 and the opposite end at the surface of the galley compartment or the face of the air exchange compartment.

In some embodiments, the poppet-style valve assembly 128 further includes the poppet head 312 and the aforementioned poppet stem 308. The poppet stem 308 is coupled with one end to the piston 212, with the opposite end coupled to the poppet head 312. The poppet stem 308 is inserted into a channel 316 formed within the poppet body element 300 (e.g., formed by the crossmembers 306 and/or gussets 304). In some embodiments, the poppet stem 308 is inserted through the center of the return spring 214.

In some embodiments, the poppet-style valve assembly 128 further includes a poppet seat 320. The poppet seat 320 seals off airflow when the poppet-style valve assembly 128 is in the closed position (e.g., when the poppet head 312 is seated against the poppet body element 300). Upon articulation of the poppet stem 308 by the articulation assembly, the poppet head 312 is removed from the poppet seat 320, allowing air from the galley compartment 104 to enter the plenum chamber 108 through the apertures 305.

In some embodiments the actuating assembly 200 and the poppet-style valve 128 is configured to bleed air through the surface of the galley compartment 104 and/or the face of the plenum chamber 105 (e.g., through an air bleed pathway). By bleeding a small amount of air, the space within and immediately surrounding the actuating assembly 200 will mix rapidly with the surrounding air (e.g., such as air near heat producing appliances), further exposing the heat-expanding material 208 to the air and decreasing the response time of the actuating assembly 200.

Figure 5:
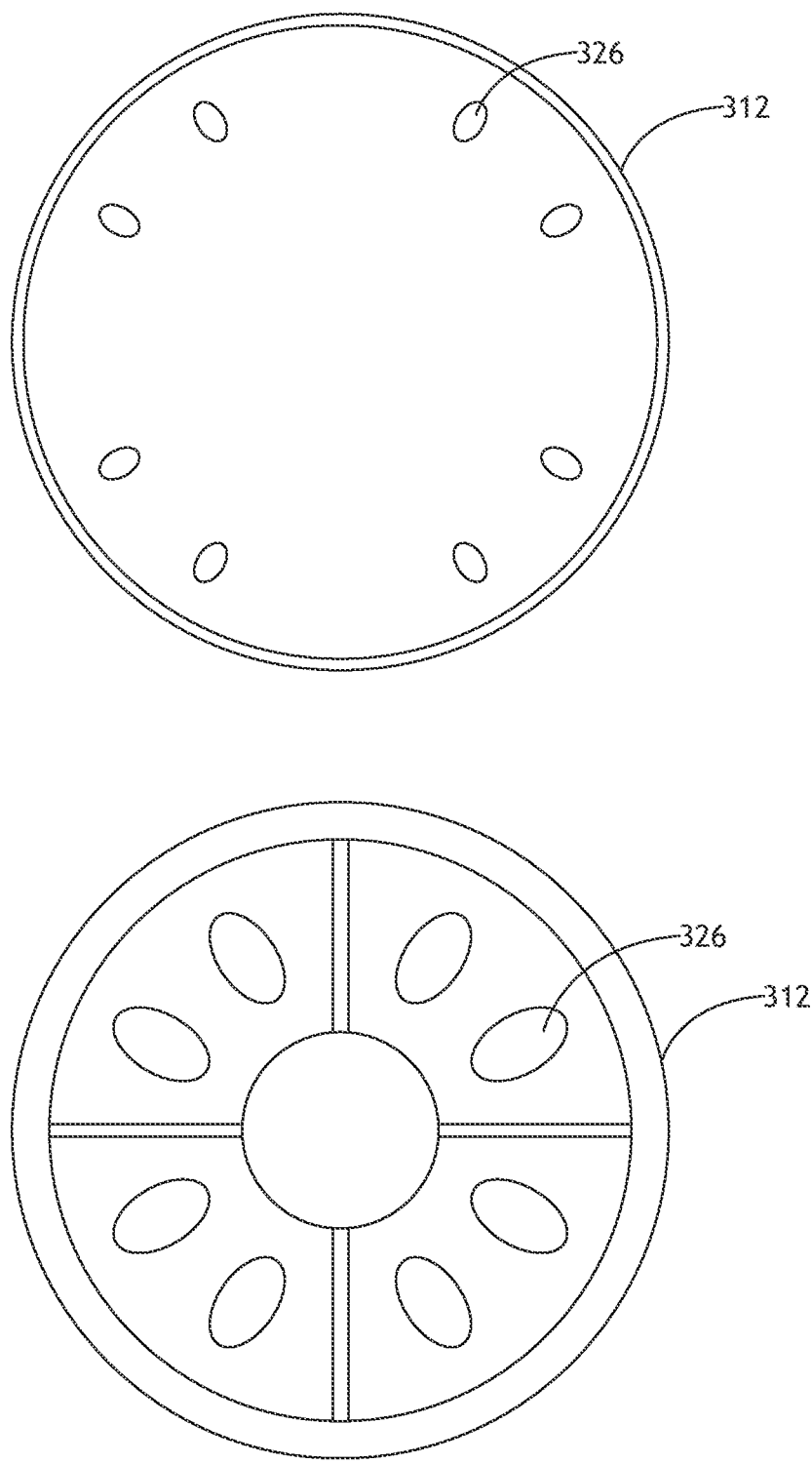
FIG. 5 is a diagram illustrating a plan view (top) and an underneath view (bottom) of a poppet head, in in accordance with one or more embodiments of this disclosure.

In some embodiments, the poppet head 312 further contains one or more bleed holes 326. The one or more bleed holes 326 assist is moving a small amount of air through the components of the actuating assembly 200 and the poppet-like valve assembly 128. The movement of air assists in exposing the heat-expanding material 208 to the surrounding air, increasing the rapidity of the heat-expanding material to respond to a change in temperature. In some embodiments, the air enters the bleed holes 326 from the poppet body element 300. An arrangement of bleed holes is illustrated in FIG. 5. For example, while the poppet-style valve assembly is in a closed state, air from the plenum chamber 108 may flow into the poppet body element 300 (e.g., through the apertures 305), through the entrance of the one or more bleed holes 326 on the underside of the poppet head 312, and flow out of the poppet head 312 via the exit of the one of more bleed holes 326 into the adapter duct 154. The arrangement of bleed holes may be any arrangement that allow the flow of bleed air out from the poppet head. Therefore, the above description should note be interpreted as a limitation of the present disclosure, but merely an illustration.

The ability of the louver-type valve assembly 124 and the poppet-style valve assembly 128 to each have individual heal-responsive actuating devices allow efficient control of galley without overtaxing the aircraft air extraction system. For instance, a louver-style valve assembly 124 located near an oven may cause the heat-expanding material 208 within the actuating assembly 200 of the louver-type valve assembly to actuate when the oven has warmed the surrounding air after cooking a meal, while a separate louver-style valve assembly 124 near a nonoperating toaster may stay closed if the surrounding air is not hot enough to actuate the actuating assembly of the louver-style valve assembly 124. The ability of the louver-style valve assemblies 124 to selectively open increases the airflow at the section of the galley compartment 104 with the heated air to the plenum chamber 108. Once air within the plenum chamber has been heated sufficiently, the poppet-style valve assembly will actuate, and a larger volume of air can be extracted from the galley compartment. The stepwise use of louver-style valve assemblies 124 and poppet-style valve assemblies 128 allow the extraction of air from specific portions of the galley compartment and ensure that overall air extraction is only turned on when necessary. This control of air extraction from the galley compartment may allow the aircraft air extraction system to more effectively remove air from other areas of the aircraft, such as the lavatory.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

What is claimed is:

1. A system for controlling airflow from a galley compartment to an air extraction system plenum chamber comprising:
    an actuating assembly comprising:
    a cylinder;
    a heat-expanding material disposed within the cylinder;
    a piston disposed within the cylinder, wherein the heat-expanding material is configured to actuate the piston when the heat-expanding material is heated;
    a piston seal; and
    a return spring seated at one end at the piston and its opposite end at a retaining surface proximate to an open face of the cylinder, wherein a compressive force of the spring upon the piston at least partially counteracts the force of the heat-expanding material on the piston; and
    a valve assembly coupled to the actuating assembly and disposed upon at least one of a surface of the galley compartment or a face of the plenum chamber, wherein an adjustment of the valve by the actuating assembly adjusts airflow within an opening of at least one of the galley compartment or the plenum chamber.

2. The system of claim 1, wherein the valve assembly further comprises:
    a connecting rod, wherein a first end of the connecting rod is coupled to the piston;
    a louver assembly coupled to a second end of the connecting rod, comprising:
    a louver frame;
    one or more louver blades disposed within the louver frame; and
    a bracket coupled to the louver frame and to the connecting rod, wherein an articulation of the connecting rod causes a movement of one or more louver blades, wherein the movement of one or more louver blades adjusts an airflow within an opening of at least one of the surface of the galley compartment or the face of the plenum chamber.

3. The system of claim 2, wherein the one or more louver blades are configured to pivot relative to the louver frame upon the articulation of the connecting rod.

4. The system of claim 2 wherein the one or more louver blades are configured to rotate along a rotation axis, wherein the rotation adjusts airflow within the opening of at least one of the surface of the galley compartment or the face of the plenum chamber.

5. The system of claim 2, further comprising an air bleed pathway configured to allow air from the galley compartment to contact the heat-expanding material.

6. The system of claim 1, wherein the valve assembly further comprises a poppet valve, the poppet valve further comprising:
    a poppet body element coupled to an open side of the cylinder, wherein the poppet body element is coupled to at least one of the surface of the galley compartment or the face of the plenum chamber;

a poppet stem coupled to the piston and inserted within a channel formed in the poppet body element, and
a poppet head coupled to the poppet stem, wherein a movement of the poppet head adjusts an airflow within an opening of at least one of the surface of the galley compartment or the face of the plenum chamber.

7. The system of claim 6, further comprising an air bleed pathway configured allow air from the galley compartment to contact the heat-expanding material.

8. The system of claim 7, wherein the air bleed pathway is further configured to move air through one or more air bleed holes within the poppet head.

9. The system of claim 6, wherein the valve assembly is coupled to a manifold.

10. The system of claim 1, comprising two or more actuating assemblies.

11. An aircraft galley comprising:
an actuating assembly comprising:
a cylinder;
a heat-expanding material disposed within the cylinder;
a piston disposed within the cylinder, wherein the heat-expanding material is configured to actuate the piston when the heat-expanding material is heated;
a piston seal;
and a return spring seated at one end at the piston and its opposite end at a retaining surface proximate to an open face of the cylinder, wherein a compressive force of the spring upon the piston at least partially counteracts the force of the heat-expanding material on the piston;
and a valve assembly coupled to the actuating assembly and disposed upon at least one of a surface of a galley compartment or a face of an air extraction system plenum chamber, wherein an adjustment of the valve by the actuating assembly adjusts airflow within an opening of at least one of the galley compartment or the plenum chamber.

12. The aircraft galley of claim 11, wherein the valve assembly further comprises:
a connecting rod, wherein a first end of the connecting rod is coupled to the piston;
a louver assembly coupled to a second end of the connecting rod, comprising:
a louver frame;
one or more louver blades disposed within the louver frame; and
a bracket coupled to the louver frame and to the connecting rod, wherein an articulation of the connecting rod causes a movement of one or more louver blades, wherein the movement of one or more louver blades adjusts an airflow within an opening of at least one of the surface of the galley compartment or the face of the plenum chamber.

13. The aircraft galley of claim 12 wherein the one or more louver blades are configured to rotate along a rotation axis, wherein the rotation adjusts airflow within the opening of at least one of the surface of the galley compartment or the face of the plenum chamber.

14. The aircraft galley of claim 11, wherein the valve assembly further comprises a poppet valve, the poppet valve further comprising:
a poppet body element coupled to an open side of the cylinder, wherein the poppet body element is coupled to at least one of the surface of the galley compartment or the face of the plenum chamber;
a poppet stem coupled to the piston and inserted within a channel formed in the poppet body element, and
a poppet head coupled to the poppet stem, wherein a movement of the poppet head adjusts an airflow within an opening of at least one of the surface of the galley compartment or the face of the plenum chamber.

15. The aircraft galley of claim 14, further comprising an air bleed pathway configured allow air from the galley compartment to contact the heat-expanding material.

16. The aircraft galley of claim 15, wherein the air bleed pathway is further configured to move air through one or more air bleed holes within the poppet head.

17. An aircraft galley ventilation system comprising:
an actuating assembly comprising:
a cylinder;
a heat-expanding material disposed within the cylinder;
a piston disposed within the cylinder, wherein the heat-expanding material is configured to actuate the piston when the heat-expanding material is heated;
a piston seal;
and a return spring seated at one end at the piston and its opposite end at a retaining surface proximate to an open face of the cylinder, wherein a compressive force of the spring upon the piston at least partially counteracts the force of the heat-expanding material on the piston;
and a valve assembly coupled to the actuating assembly and disposed upon at least one of a surface of a galley compartment or a face of an air extraction system plenum chamber, wherein an adjustment of the valve by the actuating assembly adjusts airflow within an opening of at least one of the galley compartment or the plenum chamber.

18. The aircraft galley ventilation system of claim 17, wherein the valve assembly further comprises:
a connecting rod, wherein a first end of the connecting rod is coupled to the piston;
a louver assembly coupled to a second end of the connecting rod, comprising:
a louver frame;
one or more louver blades disposed within the louver frame; and
a bracket coupled to the louver frame and to the connecting rod, wherein an articulation of the connecting rod causes a movement of one or more louver blades, wherein the movement of one or more louver blades adjusts an airflow within an opening of at least one of the surface of the galley compartment or the face of the plenum chamber.

19. The aircraft galley ventilation system of claim 18 wherein the one or more louver blades are configured to rotate along a rotation axis, wherein the rotation adjusts airflow within the opening of at least one of the surface of the galley compartment or the face of the plenum chamber.

20. The aircraft galley ventilation system of claim 18, wherein the valve assembly further comprises a poppet valve, the poppet valve further comprising:
a poppet body element coupled to an open side of the cylinder, wherein the poppet body element is coupled to at least one of the surface of the galley compartment or the face of the plenum chamber;
a poppet stem coupled to the piston and inserted within a channel formed in the poppet body element, and
a poppet head coupled to the poppet stem, wherein a movement of the poppet head adjusts an airflow within the opening of at least one of the surface of the galley compartment or the face of the plenum chamber.

* * * * *